US009317124B2

(12) United States Patent
Kongqiao et al.

(10) Patent No.: US 9,317,124 B2
(45) Date of Patent: Apr. 19, 2016

(54) COMMAND INPUT BY HAND GESTURES CAPTURED FROM CAMERA

(75) Inventors: Wang Kongqiao, Beijing (CN); Roope Takala, Helsinki (FI); Yikai Fang, Beijing (CN); Hanqing Lu, Beijing (CN); Qingshan Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 968 days.

(21) Appl. No.: 11/536,373

(22) Filed: Sep. 28, 2006

(65) Prior Publication Data

US 2008/0244465 A1    Oct. 2, 2008

(51) Int. Cl.
*G06F 3/00* (2006.01)
*G06F 3/01* (2006.01)
*G06K 9/00* (2006.01)

(52) U.S. Cl.
CPC ............ *G06F 3/017* (2013.01); *G06K 9/00375* (2013.01)

(58) Field of Classification Search
CPC ....................................................... G06F 3/017
USPC ....................................................... 715/863
See application file for complete search history.

(56) References Cited

U.S. PATENT DOCUMENTS

| 5,533,110 | A | * | 7/1996 | Pinard et al. ............. 379/355.01 |
| 5,751,843 | A | * | 5/1998 | Maggioni et al. ............. 382/154 |
| 5,946,485 | A | * | 8/1999 | Weeren et al. ................ 717/109 |
| 6,002,808 | A | * | 12/1999 | Freeman ........................ 382/288 |
| 6,771,294 | B1 | * | 8/2004 | Pulli et al. ...................... 715/863 |
| 6,996,460 | B1 | * | 2/2006 | Krahnstoever et al. ........... 701/1 |
| 7,123,783 | B2 | * | 10/2006 | Gargesha et al. ............. 382/308 |
| 7,200,266 | B2 | * | 4/2007 | Ozer et al. ..................... 382/173 |
| 2002/0021278 | A1 | * | 2/2002 | Hinckley et al. .............. 345/156 |
| 2002/0118880 | A1 | * | 8/2002 | Liu et al. ....................... 382/199 |
| 2002/0167488 | A1 | * | 11/2002 | Hinckley et al. .............. 345/156 |
| 2004/0056907 | A1 | * | 3/2004 | Sharma et al. ................. 345/863 |
| 2004/0120581 | A1 | | 6/2004 | Ozer et al. |
| 2004/0189720 | A1 | * | 9/2004 | Wilson et al. ................. 345/863 |
| 2005/0210418 | A1 | * | 9/2005 | Marvit et al. ................. 715/863 |
| 2006/0136846 | A1 | | 6/2006 | Im et al. |
| 2006/0209021 | A1 | | 9/2006 | Yoo et al. |
| 2009/0135162 | A1 | * | 5/2009 | Van De Wijdeven et al. 345/175 |

FOREIGN PATENT DOCUMENTS

KR    2007073303   A   *   7/2007

OTHER PUBLICATIONS

Park Y G, Priority-Data: (Jan. 4, 2006) Derwent-Acc-No. 2008-C59022 Title: System providing short message transmission service to mobile terminal by using motion recognition concerned with storing user's various motions by camera and transmitting short message to mobile terminal if identical motion is detected.*

(Continued)

*Primary Examiner* — Sara England
(74) *Attorney, Agent, or Firm* — Alston & Bird LLP (57) ABSTRACT

A method and system for invoking an operation of a communication terminal in response to registering and interpreting a predetermined motion or pattern of an object. An input is received, the image data of the object is captured and the object in the image data is identified.

23 Claims, 5 Drawing Sheets

(56) References Cited

OTHER PUBLICATIONS

Park Y G, "System providing short message transmission service to mobile terminal by using motion recognition concerned with storing user's various motions by camera and transmitting short message to mobile terminal if identical motion is detected" Derwent-Acc-No. 2008-C59022, Pub-No. KR2007073303A Appl-No. 2006KR-001049, Jan. 4, 2006.*

"eyeSight and CogniVue Demonstrate Gesture Recognition and Face Detection on Smallest Form Factor Lowest Power Smart Camera Module" Las Vegas, Nevada—Jan. 9, 2011—http://www.cognivue.com/news/news_12_01_09.php#sthash.1GAOGGXQ.dpuf.*

Kratz, Sven, Ballagas, Rafael, "Gesture Recognition Using Motion Estimation on Mobile Phones" , 2007. https://hci.rwth-aachen.de/materials/publications/kratz2007a.pdf.*

Jeff A. Bilmes, "A Gentle Tutorial of the EM Algorithm and its Application to Parameter Estimation for Gaussian Mixture and Hidden Markov Models", International Computer Science Institute, Apr. 1998, pp. 1-13, Berkeley, CA.

Rein-Lien Hsu, et al., "Face Detection in Color Images", IEEE Transactions on Pattern Analysis and Machine Intellingence, vol. 24, No. 5, May 2002, pp. 696-706.

Lei Xu, et al., "On Convergence Properties of the EM Algorithm for Gaussian Mixtures", Neural Computation 8, pp. 129-151, 1996, Massachusetts Institute of Technology.

Jie Yang, et al., "A Real-Time Face Tracker", School of Computer Science, Carnegie Mellon University, Pittsburgh, PA, 1996, pp. 142-147.

Ming-Hsuan Yang, et al., "Detecting Faces in Images: A Survey", IEEE Transactions on Pattern Analysis and Machine Intelligence, vol. 24, No. 1, Jan. 2002, pp. 34-58.

International Search Report, Application No. PCT/IB2007/002766, mailed Mar. 14, 2008.

Chinese Office Action dated Aug. 11, 2010.

Chinese Office Action dated Nov. 17, 2010.

Chinese Office Action dated Jan. 11, 2011.

* cited by examiner

COMMAND INPUT BY HAND GESTURES CAPTURED FROM CAMERA

FIELD

The disclosed embodiments relate to a method for mapping of gestures to particular functions of a communications terminal. In particular, it relates to a method for invoking an operation of a communication terminal in response to registering and interpreting a predetermined motion or pattern of an object. It furthermore relates to a computer program arranged to perform said method.

BACKGROUND

In interacting with electronic devices such as computer terminals, cameras, mobile phones, and television sets, people have become used to enter information and maneuver these electronic devices through keyboards, touch sensitive displays etc.

With the increased popularity of hand held devices, and the miniaturization of these, usability problems caused by the decrease in size of the input means of these devices becomes apparent. Hence, an alternative solution for providing input to electronic devices, especially handheld ones, is sought. It is furthermore an aim to find a more natural interaction between humans and computing devices.

Various input techniques that are experimented with include accessory sensor modalities connected to computing devices, such as motion sensors, surface muscle or nerve sensors, etc. for acquiring specified gestures. However, as a drawback the use of such sensors require extensive computational power, something which is associated with considerable costs.

Hence, it is desired to develop an input technology that is able to solve the usability problems brought from the miniaturization of input devices.

SUMMARY

In the following, a natural UI interaction system based on hand gestures captured from one or more cameras is presented. With the system integrated in mobile devices, it will efficiently solve the conflict of miniaturized hardware and maximized software input, meanwhile, the interaction by hand gestures will dramatically improve the usability of the mobile devices.

In one embodiment, a communication terminal is provided that is capable of establishing interaction with an external object by detecting and recognizing predetermined motions for controlling the communication terminal.

In another embodiment, a communication terminal is provided with proximity detection for activating the interaction with an external object for detection and recognition of predetermined motions.

In a further embodiment, a method comprises invoking an operation of a communication terminal in response to registering and interpreting a predetermined motion or pattern of an object. A convenient solution for realizing command input to a communication terminal, such as a mobile phone is realized. As a further advantage, a direct solution for the conflict of device miniaturization and usability is provided. The interaction is more natural, and input is not limited by the miniaturization of device hardware. The term invoking is may also be construed as associating.

The motion or pattern may advantageously be registered and interpreted visually, such as by capturing an image of an object. Advantageously, image input is readily provided by a camera, for instance integrated in the communication terminal.

According to one embodiment, the object comprises a hand and the predetermined motion or pattern comprises a hand gesture. As an advantage, a natural interaction between humans and computing devices can be achieved by using hand gestures for command input and navigation of user interface to the devices. Furthermore, the user may move the hand according to predetermined patterns, which may have been set by the user at a previous occasion, and thereby invoke different operations of the mobile phone such as calling the sender of the message, go to the next message and so forth.

According to various embodiments, the wording registering may be construed as capturing image data, and the wording interpreting may be construed as recognizing an object as a hand and recognizing and associating a gesture of the hand with a reference gesture. According to one embodiment of the invention, the wording interpreting may be construed as comprising steps of identifying an object, recognizing the object, determining its orientation, recognizing and associating it with a hand gesture. The interpretation may be performed by a software of the terminal.

Furthermore, according to another embodiment of the method according to the invention, the operation involves provision of a command input to the communication terminal using a hand gesture, and the method comprises:

capturing image data of a hand gesture 201;
identifying an object in said image data 202;
recognizing object as a hand 203
recognizing and associating characteristics of said object of said hand with a first reference gesture from a set of predetermined reference gestures 205
providing a command input associated with said reference gesture 206.

The wording capturing image data may be construed as simply taking a picture with an image capturing device, such as a camera of for instance a mobile phone.

With the wording identifying an object in said image data, it may be construed as finding an object in the picture.

According to one embodiment, said identification involves classifying skin color. As an advantage, human-like objects, such as a hand may be recognized from an image.

According to another embodiment, the skin color classification comprises performing Gaussian mixture modelling. Hence, the complex nature of human skin color and intensity spectra is imitated and, as an advantage, the precision of recognizing objects comprising human skin within an image is increased.

Advantageously, various techniques may be employed to improve the process of separating noisy regions from wanted regions of a gesture. For instance, according to one embodiment, the color classification may involve color space analysis and/or probability analysis.

Furthermore, according to another embodiment, the color space analysis may involve conversion of image data to chrominance plane (CbCr) color space image data.

According to still yet another embodiment, the object recognition may involve eliminating visual noise using connected component extraction.

According to one embodiment, the connected component extraction may comprise any of the following:

determining aspect ratio of the object;
determining size of object compared to image size;
determining regions connecting to the borders of the input image; and wherein said noise is eliminated in case the following requirements are fulfilled:

said aspect ratio is within 10;

said object size is greater than a predetermined value set in relation to the input image size; and there is either only one region connecting to the borders of the input image, or a plurality of regions which do not meet the other requirements According to one embodiment, the association may involve a step of determining orientation of the hand and involving:

determining a Karhunen-Loeve (KL) axis orientation of said object;

determining a first geometric centerpoint of said object; and determining a second geometric centerpoint of a convex polygon of said object, and wherein the orientation of said KL axis is used to determine a positional relationship of said first and second centerpoints. Hence, the first geometric centerpoint represents a geometric center of the segmented hand region, i.e., the gravity center of the hand region. The second geometric centerpoint represents the geometric center of a hand region profile, preferably represented by a convex polygon. Normally, the first geometric centerpoint does not include the information of hand shape. However, the position of the second geometric centerpoint reflects the convexity of a region. Hence, by determining the KL axis of the hand region, the location relation of the first and second geometric centerpoints in respect of each other can be determined. Knowing the relative position between the two centerpoints, or centers, it is possible to determine the position of the hand and recognize the gesture.

According to a further embodiment, the orientation determining arrives at one of the following:

performing a first operation, that is, for instance UP, if said KL-axis extends along a first direction, and the first and second centerpoints are displaced in a first displacement direction in relation to each other, essentially along said first direction;

performing a second operation, that is, for instance DOWN, if said KL-axis extends along said first direction, and the first and second centerpoints are displaced reversely in said displacement direction in relation to each other, essentially along said first direction;

performing a third operation, that is, for instance RIGHT, if said KL-axis extends along a second direction, essentially perpendicular to said first direction, and the first and second centerpoints are displaced in a second displacement direction in relation to each other, essentially along said second direction;

performing a fourth operation, that is, for instance LEFT, if said KL-axis extends along said second direction, and the first and second centerpoints are displaced reversely in said displacement direction in relation each other, essentially along said second direction;

performing a fifth operation, that is, for instance OPEN, if said centerpoints are essentially superpositioned, and a first area of said object of said gesture is less than at least half a second area of a previously determined object of a previously recognized gesture;

performing a sixth operation, that is, for instance CLOSE, if said centerpoints are essentially superpositioned, a first area of said object of said gesture is greater than at least twice a second area of a previously determined object of a previously recognized gesture, and said gesture corresponds to said previously recognized gesture.

performing a seventh operation, that is for instance STOP, if said centerpoints are essentially superpositioned, a first area of said object of said gesture is greater than at least twice a second area of a previously determined object of a previously recognized gesture, and said gesture does not correspond to said previously recognized gesture.

According to a preferred embodiment in a common, general reference frame, the first, second, third, and fourth operations correspond to moving focus up, down, left, and right respectively, and said fifth, sixth, and seventh operations correspond to open an item, such as a file, folder or image, close a file folder or image, and stop the focus motion respectively. The wording focus refers to focus of an item, such as an image, a file, a contact, a detail entry, phone number, or the alike.

Furthermore, according to one preferred embodiment, the first KL axis direction is vertically upwards, and the second KL axis direction horizontally to the left.

With being essentially superpositioned, it is to be construed that the two centerpoints are in the vicinity of each other and not necessarily completely superpositioned.

According to one embodiment, the registering may be performed using a camera comprised by the communication terminal.

According a further embodiment, the communication terminal may comprise a mobile phone.

The wording gesture should in this context be construed as a single formation or shape of a gesticulation produced with a hand, such as a closed fist, open hand, closed hand with thumb extended and pointing in a direction. The wording gesture is also to be construed as a group consisting of a sequence of single gestures after each other and furthermore, also as a gesture comprising a moving hand, such as a ticking-in-the-air with a finger.

The wording image data is to be construed as a still image or a series of still images, such as a video sequence.

According to yet another embodiment, the method further comprises a step of activation by proximity detection. Hence, equipped with a proximity sensor that detects range to nearby objects, means for registering motions may be activated by proximity detection, rendering it enough to approach the terminal with an object without bringing them into mechanical contact. Useable proximity switches may comprise inductive, capacitive, electromagnetic radiation or ultrasonic types. Detecting electromagnetic radiation includes optical sensing and infrared radiation as detected from emitted heat from for instance, the hand of a user.

The above advantages and features together with numerous other s advantages and features, which will become evident from below detailed description, are obtained according to a second aspect of the disclosed embodiments by a computer-readable medium having computer-executable components, said computer-readable medium being adapted to invoke an operation of a communication terminal in response to registering and interpreting a predetermined motion or pattern of an object.

Especially, according to one embodiment, the computer-readable medium may further be adapted to:

receive an input;

capture image data of said object;

identify said object in said image data;

recognize said object as a hand;

recognize and associate characteristics of said object as a gesture of said hand with a first reference gesture from a set of predetermined reference gestures;

provide a command input associated with said reference object. Hence, as an advantage, the features of the present invention are enabled in any mobile communication apparatus having the ability to download and run such a computer program.

In other words, the disclosed embodiments provide a method for controlling different operations of a communication terminal by recognition of predetermined motions of an object. In the case where a hand, such as the user's, is used as the object, the predetermined motions may comprise closing the hand into a fist, grabbing, waving, pointing with one or more fingers, or like a pattern, such as comprising a series of motions. Hence, the predetermined motions may be coupled or paired with actions, commands or tasks which are executed by the communication terminal. The wording controlling is in this context also to be construed as invoking or executing different operations of the mobile communications terminal.

The predetermined motions may be recognized to control opening and/or closing items of media content, accessing previous or next item of media content in a list or stack of items, deleting an item of media content, scrolling through the content of an item of media content, answering an incoming voice call, take an action on an item selected from a list of items, call the sender of SMS or ending the projection.

The incoming communication may comprise a message, such as an SMS or MMS. As media content or message may comprise text, image, video or any combinations thereof. Although these messaging services are the most frequently used today, the invention is also intended for use with other types of text or multimedia messages.

The method may further comprise a step of moving the object away from the projector along a projected cone of light until a preferred size of the image is obtained. By virtually holding the information in the hand the user feel in control of the presentation, only revealing data for him or herself. The nature of the gesture is intuitive for the user getting the impression and feeling of taking the image with the hand, out of the communication terminal and after having reviewed the information, putting the it back into the terminal again.

The method may further comprise a step of moving the object back to the device and/or a step of detecting a second tap to end projection of said image. Hence, in an intuitive manner, the user will perform the same steps as when initiating the process, only in a reverse order.

The object referred to may be the hand of, for instance, a user of the communication terminal. Among the advantages of using a hand is the direct possibility of slightly folding the hand to shield off the image from the environment. Other objects that can be used comprise a newspaper, a pencil or even an umbrella.

The predetermined motions may be detected and recognized by using an image-acquiring means. An image-acquiring means could be, for instance, any type of digital camera, such as a CMOS camera.

The wording interpreting may also be interpreted as recognizing.

A natural interaction between humans and computing devices can be achieved by using hand gestures for command input and navigation of user interface to the devices. Especially, with the availability of mobile camera devices and powerful image/video content analysis and pattern recognition technologies realizing command input by hand gestures through camera input is a convenient solution, expected to be highly appreciated by end users.

In other words, with the invention disclosed herein, input technology is able to provide one direct solution for the conflict of device miniaturization and usability. The interaction is more natural. Input is not limited by the miniaturization of device hardware. Hence, the way of interaction presented with this invention provides an advantageous, hands free solution with numerous benefits, especially for hand held communication devices.

BRIEF DESCRIPTION OF THE DRAWINGS

The above, as well as additional objects, features and advantages of the disclosed embodiments, will be better understood through the following illustrative and non-limiting detailed description of preferred embodiments, with reference to the appended drawing, wherein:

FIG. 5, including FIGS. 5(a) and 5(b), shows plotted skin color samples according to example embodiments.

DETAILED DESCRIPTION OF PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the disclosed embodiments.

Figure 1:
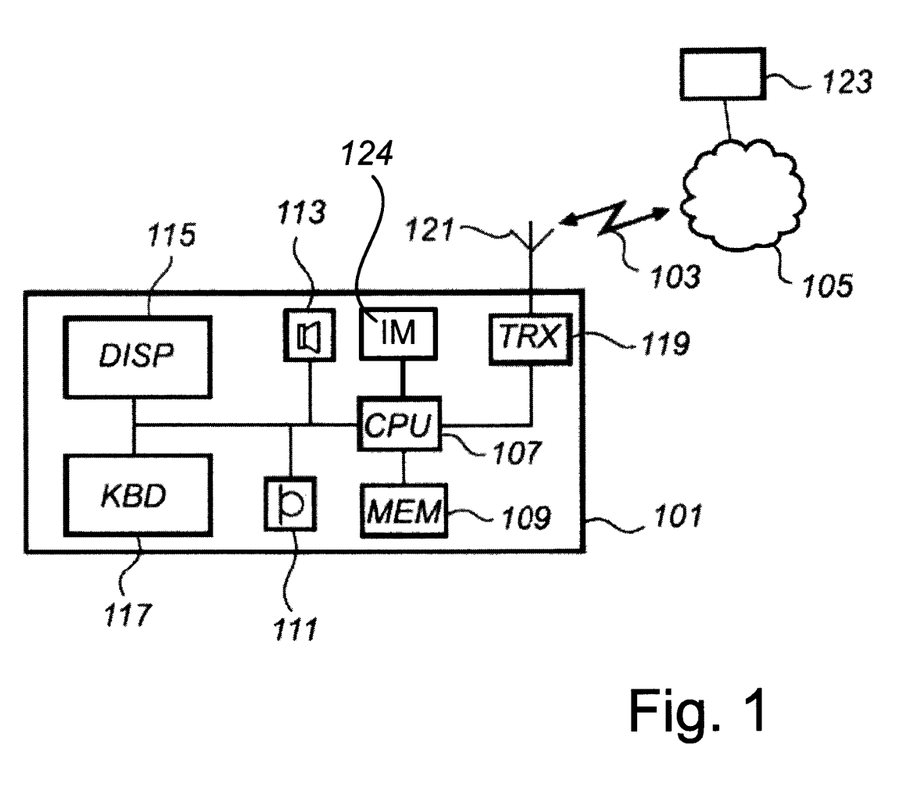
FIG. 1 shows schematically a flow chart of a gesture recognition process according to one embodiment.

FIG. 1 illustrates schematically a communication terminal 101 in which the aspects of the disclosed embodiments can be implemented. The terminal 101 is capable of communication via an air interface 103 with a radio communication network 105 such as the well known systems CDMA2000, D-AMPS, GSM, UMTS, EDGE, etc. The terminal comprises a processor 107, memory 109 as well as input/output units in the form of a microphone 111, a speaker 113, a display 115 and a keyboard 117. Radio communication is realized by radio circuitry 119 and an antenna 121. Connected to the radio communication network 105 is a controller 123. The details regarding how these units communicate are known to the person skilled in the art and is therefore not discussed further. The terminal 101 is further comprises an imaging unit 124 for capturing image data.

Figure 2:
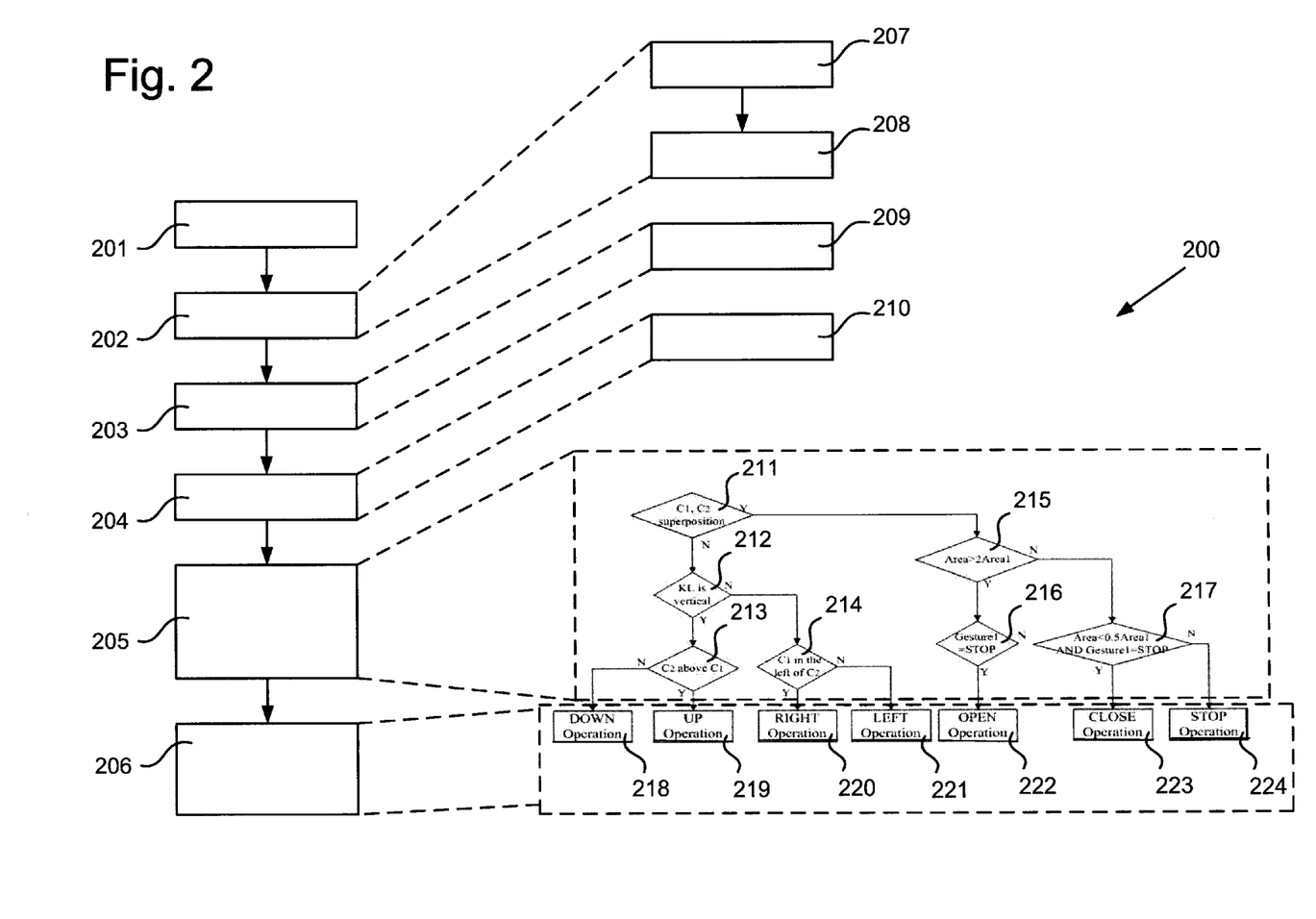
FIG. 2 shows schematically a block diagram according to a method.

In FIG. 2, it is depicted a flow chart for a method for providing a command input to a communication terminal using hand gestures. In particular, it shows a gesture recognition process according to the present invention. In a first step 201 of the depicted method, image data of a hand gesture is captured with image acquiring means, preferably with a digital camera of a mobile phone. An image-acquiring means could be, for instance, any type of digital camera, such as a CCD (Charge-Coupled Device) or CMOS (Complementary Metal Oxide Semiconductor) based camera for image recording.

In a second step 202 of the method, one or more objects are identified from the image data. Further details of how the object identification is performed is outlined below in steps 207 and 208 for skin color segmentation and connected component labeling and mergence 208 respectively.

In a third step 203 of the method, it is investigated whether, or not, any of the objects corresponds to a hand. For this, a number of hand gesture requirements must be fulfilled, the details of which are given below in connection with step 209 for noise area elimination.

In a fourth step 204 of the method, the orientation of the hand is determined. This is done in an orientation-based geometric approach using Karhunen-Loeve orientation, which will be described in further detail below in connection with step 210.

In a fifth step 205 of the method, the gesture of the hand is recognized and associated with one of a set of predetermined gestures. The procedure for this is described in further detail below in connection with steps 211 to 217.

In a sixth step 206 of the method, it is provided an input corresponding to the recognized gesture. The various input alternatives are described in greater detail below in connection with steps 218 to 224.

Further to the step 202 of the method as depicted in FIG. 2, the process of object identification involves a step of skin color segmentation 207 for identifying skin colored regions in the image. The technique of skin color segmentation, or skin color classification, can be described as a classification of individual image pixels into skin and non-skin categories. For this purpose, color space analysis is used. A wide variety of color spaces have been used in skin segmentation such as RGB, HSV and YCbCr etc.

RGB colour space is one of the most widely-used color spaces for processing and storing colour image data, but normally it does not fit for colour analysis and colour based recognition due to the high correlation between channels and mixing of chrominance and luminance data.

Hue-saturation based color spaces like HSV, HSI, HSL are models which are consistent to human's intuitive perceptions and similar to how an artist actually mixes colours. Especially Hue has the invariant property to white light sources and ambient light and surface orientation.

YCbCr is a hardware-oriented model. In the colour space, the luminance is separated from the chrominance data. Cb and Cr values are formed by subtracting luma from RGB red and blue components. The transformation simplicity and explicit separation of luminance and chrominance components make this color space attractive for skin colour modelling [Hsu et al. 2002].

In order to select either a Hue-based color space or YCbCr space to make skin color detection invariant to luminance, YCbCr and HSV are evaluated respectively with a set of skin color training data, which is composed of 550 skin color samples extracted from various still images and video frames, covering a large range of skin color appearance (totally more than 20 million skin color pixels in the skin sample data).

Figure 5:
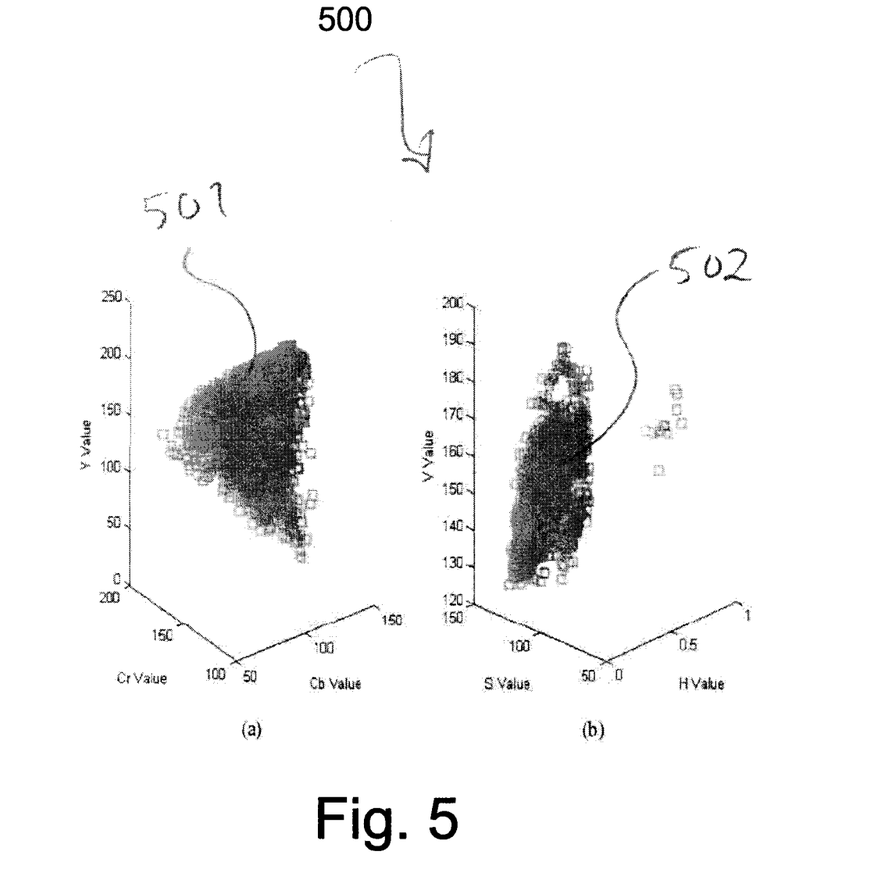

In FIG. 5, skin color samples 500 are plotted in YCbCr space section a) and HSV space section b), respectively. It is clearly seen that the skin color samples form a single and compact cluster 501 and 502 in both YCbCr and HSV color spaces. In YCbCr color space, it is observed that the intensity value Y has little influence on the distribution in the CbCr plane and the sample skin colors form smaller and more compact cluster in the CbCr plane. Hence, in the invention, the chrominance plane (CbCr) is directly used for skin color classification without taking the intensity value into account. Thus, the comparison of FIG. 5 illustrates why it may be preferable to select YCrCb space for skin-color region segmentation. Furthermore, the data is also used to train the skin-color model used for hand region segmentation.

For modelling the skin color segmentation, a Gaussian mixture model and Expectation Maximization (EM) estimation is used.

Gaussian density functions and a mixture of Gaussians are often used to model skin color [Yang et al. 2002]. The parameters in a unimodal Gaussian distribution are often estimated using maximum-likelihood. The motivation for using a mixture of Gaussians is based on the observation that the colour histogram for the human skin with different ethnic background does not form a unimodal distribution, but rather a multimodal distribution.

With a unimodal Gaussian, the class-conditional probability distribution function (PDF) of skin color is approximated by a parametric functional form [Yang, Waible 1996].

$$p(x|\text{skin})=g(x;m_s,C_s)=(2\pi)^{-d/2}|C_s|^{-1/2}\exp\{-(x-m_s)^T C_s^{-1}(x-m_s)\} \quad (1)$$

where d is the dimension of the feature vector, $m_s$ is the mean vector and $C_s$ is the covariance matrix of the skin class. In the case of multimodal distribution, skin color distributions are approximated by GMM (Gaussian Mixture Model).

$$p(x \mid \text{skin}) = \sum_{i=1}^{N_s} \omega_{s,i} g(x; m_{s,i}, C_{s,i}) \quad (2)$$

The parameters of Gaussian mixture (i.e., weights ω, means m, covariances C) are typically found using the Expectation Maximization (EM) algorithm [Bilmes 1998].

The EM algorithm is a general method of finding the maximum-likelihood estimate of the parameters of an underlying distribution from a given data set when the data is incomplete or has missing values. The mixture-density parameter estimation problem is one of the most widely-used applications of the EM algorithm [Xu, Jordan 1996]

In the invention, YCbCr color space and GMM are used to implement skin colour classification. In order to build a GMM model, K-means [Duda, Hart 2001] algorithm is used to set the cluster centres, and then the parameters of each Gaussian component are estimated with EM algorithm.

In the case, the GMM model for skin color classification consists of 20 Gaussian components. Each component is a 2-element (Cb and Cr element) Gaussian distribution. The parameters of the 20 Gaussian components are listed as follows.

| No. | Weight | Centre | Covariance |
|---|---|---|---|
| 1 | 0.0702 | (109.8462, 151.5873) | (5.2380, 6.2722) |
| 2 | 0.0657 | (99.9267, 159.2890) | (2.6080, 6.9135) |
| 3 | 0.0861 | (112.8403, 144.3406) | (9.1854, 16.0524) |
| 4 | 0.0737 | (107.4903, 157.2522) | (6.6948, 5.4418) |
| 5 | 0.0393 | (96.5935, 152.4062) | (31.4322, 44.6357) |
| 6 | 0.0128 | (82.6950, 157.0569) | (25.4192, 25.2871) |
| 7 | 0.0351 | (94.6656, 170.6002) | (4.7205, 16.8803) |
| 8 | 0.0626 | (116.0954, 146.3582) | (8.8988, 15.1916) |
| 9 | 0.0645 | (95.1594, 160.7084) | (3.7062, 15.6597) |
| 10 | 0.0203 | (79.6508, 170.3406) | (31.2517, 39.3632) |
| 11 | 0.0552 | (120.2977, 138.1978) | (9.4732, 15.4720) |
| 12 | 0.0623 | (102.9900, 157.9256) | (0.8807, 4.7835) |
| 13 | 0.0184 | (84.0346, 181.6167) | (100.3211, 52.0002) |
| 14 | 0.0428 | (102.1408, 167.0846) | (26.0495, 4.2852) |
| 15 | 0.0767 | (104.3367, 153.5133) | (5.8803, 3.6749) |
| 16 | 0.0275 | (113.8521, 155.1590) | (6.8684, 11.1284) |
| 17 | 0.0509 | (104.9962, 162.3113) | (21.1715, 4.5049) |
| 18 | 0.0176 | (99.4697, 173.3117) | (25.8624, 6.2579) |
| 19 | 0.0861 | (107.1334, 147.7768) | (16.2802, 13.8575) |
| 20 | 0.0323 | (88.9360, 166.3086) | (5.9463, 19.0921) |

After skin color classification, the post processing, connected component extraction [Gonzalez, Woods 2002], is needed for noise area removal.

In a step 208 of "connected component labeling and mergence" neighboring regions or components which should belong to one object are merged, and the size of the region is computed. Based on the size information of labeling objects, a step 209 of "noise area elimination" is performed to remove those noise-like small regions and those regions with regular shapes (man-made objects).

Hence, after segmentation, the original image is turned into a black/white image in which the white regions stand for objects, while the black regions stand for background. However, at the moment, the size and shape of the white regions is not known. With connected component labeling, the size and shape of the object regions are computed, and according to some given prior criteria, neighbouring object regions belonging to the same object are merged. After the step of labeling and merging, the step of noise area removal is performed to remove those small regions and those regions with regular shape (man-made objects).

According to one embodiment, there should be a unique hand region in any input gesture image. After color skin based segmentation, sometimes, not only hand region, but also other noisy regions, may be segmented. Thus, step 203 in which an object is recognized as a hand involves a step of noise elimination 209. Hence, if there are any noisy regions extracted, they are removed according to the following rules:

A hand region should have the aspect ratio within 10 (step 210);

A hand region should be enough in size comparing to the input image size. (step 211) The morphological open operation can be used to remove those small isolated regions.

All the regions connecting to the borders of the input image could be considered as noisy regions, unless there is only one segmented region which meets the two rules above. (step 212)

After noisy regions removal, the remaining region is the hand region.

Gesture Orientation Analysis

As a part of the step of associating the object with a predetermined object 204 the orientation of the hand is determined in a step 210 for determining Karhunen-Loeve (KL) orientation. This orientation-based geometric approach for hand gesture recognition comprises determining of the Karhunen-Loeve (KL) orientation, and a determining centroids of the hand region and its convex hull.

KL Orientation

Figure 4:
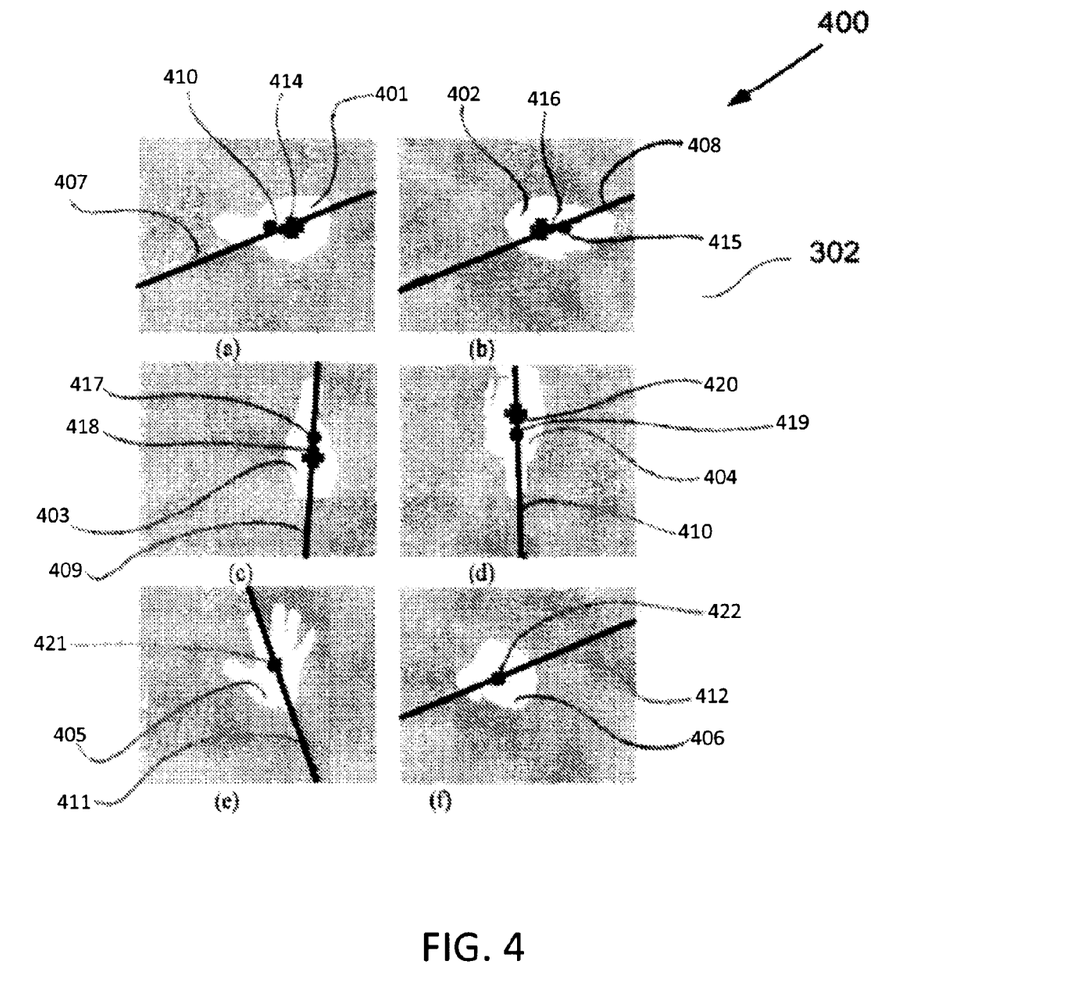
FIG. 4 shows schematically various orientations, sections a) to f), of a geometric approach for hand gesture recognition according to the disclosed embodiments.

FIG. 4 illustrates the KL orientation [Pratt 2001] and the centroids of a hand region in various orientations as depicted in section a) to f). A detailed description of FIG. 4 follows further below.

The KL orientation is derived as follows:

Assuming that each pixel coordinate in the skin colour pixel set $P_s$ of the input gesture image is $(x_{si}, y_{si})$, then $P_s = [p_{s1}\ p_{s2}\ \ldots\ p_{sN}]$, $p_{si} = (x_{si}, y_{si})^T$, $i=1\ \ldots\ N$ is coordinates of skin colour pixels. The mean of $P_s$ is $\overline{P_s} = [\overline{x_s}, \overline{y_s}]^T$, where $$\overline{x_s} = \sum_i x_i/N,\quad \overline{y_s} = \sum_i y_i/N.$$

The corresponding covariance matrix is defined as $$C_s = \frac{1}{N}\sum_i (p_{si} - \overline{P_s})(p_{si} - \overline{P_s})^T.$$

The eigen value $E_s = [e_{s1}\ e_{s2}]$ and the corresponding eigen vector $Ev_s = [ev_{s1}\ ev_{s2}]$ are easily calculated from the covariance matrix Cs. Hence, the eigen vector $ev_{s\ max}$, corresponding to the bigger eigen value $e_{s\ max}$, determines KL orientation in the image coordinate plane, refer to the dash lines 407 to 412 in FIG. 4.

Centroids of Hand Region and its Convex Hull

With the segmented hand region, shown in section d) of FIG. 4, the centroids of hand region and its convex polygon —$C_1(x_1, y_1)$ and $C_2(x_2, y_2)$ can be computed respectively.

$$x_1 = \sum_i x_{si}/N,\quad y_1 = \sum_i y_{si}/N,\ i = 1\ \ldots\ N$$

i= . . . N is ith skin color pixel in the hand region.
$C_2(x_2, y_2)$ is derived as:

$$x_2 = \frac{\int_S x_s\,ds}{\int_S ds},\quad y_2 = \frac{\int_S y_s\,ds}{\int_S ds},\ S\text{-skin area},\ ds\text{-skin area element}$$

Based on the Green theorem,
$\int_S x\,ds = -\int_L x^2\,dy, \int_S ds = \int_L x^*dy$, L—perimeter of polygon For a polygon as a sequence of line segments, this can be reduced exactly to a sum, $$x_2 = \frac{-2\sum ((x_{si}^2 + x_{si+1}^2 + x_{si}x_{si+1})(y_{si+1} - y_{si}))}{3\sum ((x_{si} + x_{si+1})(y_{si+1} - y_{si}))}$$

$$y_2 = \frac{-2\sum ((y_{si}^2 + y_{si+1}^2 + y_{si}y_{si+1})(x_{si+1} - x_{si}))}{3\sum ((x_{si} + x_{si+1})(y_{si+1} - y_{si}))}$$

The shape of the second centroid $C_2$ is created by "shortcutting" the edges connecting the hand region. The effect is thus to smear the contour of the hand region such that the thumb coalesce with the body of the hand, and the "centre of gravity" of the image object is displaced.

Further to the fifth step 205 of the method as depicted in FIG. 2, the procedure for recognizing and associating a hand gesture with one of a set of predetermined gestures is outlined in the following. Also included in the outline below is how the gestures are mapped to various input alternatives as indicated in step 206 above for providing input corresponding to a recognized gesture.

If the KL orientation of a hand region, and the centroids of the region and its convex hull have been computed, then the orientation of the hand shape can be estimated by the position relationship of the two centroids referring to the KL orientation of the hand region.

The input alternatives that are available according to this outlined embodiment of the present invention are UP, DOWN, RIGHT, LEFT, OPEN, CLOSE, and STOP. However, other input alternatives may be employed. It is furthermore also possible to have other predetermined gestures to which provided gestures can be matched from. A user may for instance provide individual gestures to the group of predetermined gestures recognized by the system. Hence, providing a learning system capable of being individualized according to each user's choice and preferences.

The principle of matching an input gesture with a reference gesture object can be described as follows: A reference gesture object is selected from a predetermined number of available reference objects by eliminating less likely alternatives, such that the last one remaining is selected. That is, for instance, knowing that there are six different alternatives to choose from, the one with best correspondence is selected.

Referring to FIG. 2, in the case of separated centroids the centerpoints in step 211, and nearly vertical KL orientation in step 212, the gesture corresponds to the operation DOWN 218 in the case the centroid the first centerpoint is above centroid the second centerpoint in step 213, and UP 219 in case the centroid the first centerpoint is below centroid the second centerpoint in step 213. Also in the case of separated centroids the centerpoints in step 211, but with nearly horizontal KL orientation in step 212, the gesture corresponds to the operation RIGHT 220 in the case the centroid the first centerpoint is to the left of centroid the second centerpoint in step 214, and LEFT 221 in the case centroid the first centerpoint is to the right of centroid the second centerpoint in step 214.

In order to optimize the use of a limited number of gestures, various input can be associated with a single gesture. Hence, according to the present example, the operations CLOSE and STOP can both be associated with a closed fist. Depending on the previous action, or operation, the closed fist gesture in step 217 results in different operations, for instance CLOSE, as in step 223, if the last input was STOP and the last gesture was an open hand. Otherwise, the resulting operation is STOP indicated by step 224. In case the area of the convex hull of the gesture is at least twice the area of the previous gesture, as indicated by step 215, and the previous operation was STOP, as indicated by step 216, then the present operation is OPEN indicated by step 222. In case the last operation had not been OPEN in the last example, the present operation had been NO operation at all as indicated in step 216.

Put it slightly different, if the KL orientation of the hand region is nearly horizontal and the two centroids are separated from one another, the gesture means LEFT or RIGHT. While in the case of nearly vertical KL orientation, the gesture means UP or DOWN. Then the positional relationship of two centroids is used to determinate the gesture meaning. It's easily understood that the difference of the two centroids is affected by the extending thumb. If the thumb extends left, the convex hull's centroid lies in the left of hand region's centroid. For the gestures RIGHT, UP and DOWN position relationship of two centroids resemble that of LEFT. On the other hand, centroid of convex hull will be in different position with that of hand region if there's a protruding thumb of hand.

According to another embodiment of the present invention, the following specifications apply:

gestures relating to UP, DOWN, LEFT and RIGHT are used to moving the focus from one item to another.
An OPEN gesture is used to open an item, while a CLOSE gesture is used to close an open item.
From a gesture order perspective, a CLOSE gesture should follow an OPEN gesture. However, if there is one or more other gestures, for instance UP/DOWN/LEFT/RIGHT between, these gestures are disabled, and the system will only accept OPEN/CLOSE gestures.
A STOP gesture is used to make the focus stop on an item.
A STOP gesture and a CLOSE gesture have the same hand gesture.
If the system detects an OPEN gesture, the gesture information, e.g., hand region size, hand gesture (OPEN), will be registered. Until the system detects a CLOSE gesture, further gestures are not accepted.
For a STOP/CLOSE gesture and OPEN gesture, the centerpoints of a hand region and its convex hull are not necessarily completely, but almost superpositioned
For a CLOSE gesture, the hand size is approximately twice smaller than the hand size of an OPEN gesture.
If there is no OPEN gesture registered, and if the system detects a fist-shape gesture, the system will consider it as a STOP gesture, not a CLOSE gesture.

An item may comprise a document, a folder, a contact, a recipient, a multimedia content, such as an image, audio or video sequence, a reminder, a multimedia message, or the alike.

FIG. 4 will be used as an illustrative example depicting in sections a) to f) various KL orientations and centroids of a hand region and its convex hull 400. For example, if the KL orientation of a hand region is nearly horizontal 407 as depicted in FIG. 4 section a) with a thumb 401 pointing to the left, and the centroid of the convex hull $C_2$ 413 lies in the left of the hand region's centroid $C_1$ 414, then the gesture corresponds to a LEFT sign. In section b), in the case where a thumb points to the right, its two centroids 415 and 416 are reversed in positions. If the KL orientation of a hand region is nearly vertical 409 as depicted in section c) of FIG. 4 with a thumb 403 pointing upwards, but $C_2$ 417 lies above $C_1$ 418, then the gesture corresponds to an UP sign. In section d), in the case where a thumb points downwards, its two centroids 419 and 420 are reversed in positions.

If the two centroids $C_1$ and $C_2$ 421 and 422 of a hand region are almost overlapping, as depicted with an open hand 405 and essentially vertical KL axis 411 in section e), and a closed fist 406 and essentially horizontal KL axis 412 in section f) of FIG. 4, the gestures are recognized as OPEN and STOP respectively. To distinguish whether a gesture is to be recognized as OPEN or STOP, it is assumed that the area of the convex hull of an open hand for OPEN is about twice the size of the area of the gesture of a closed fist corresponding to STOP. Other heuristic schemes for the differentiation include that OPEN should be performed after STOP, while CLOSE should follow OPEN, etc.

Figure 3:
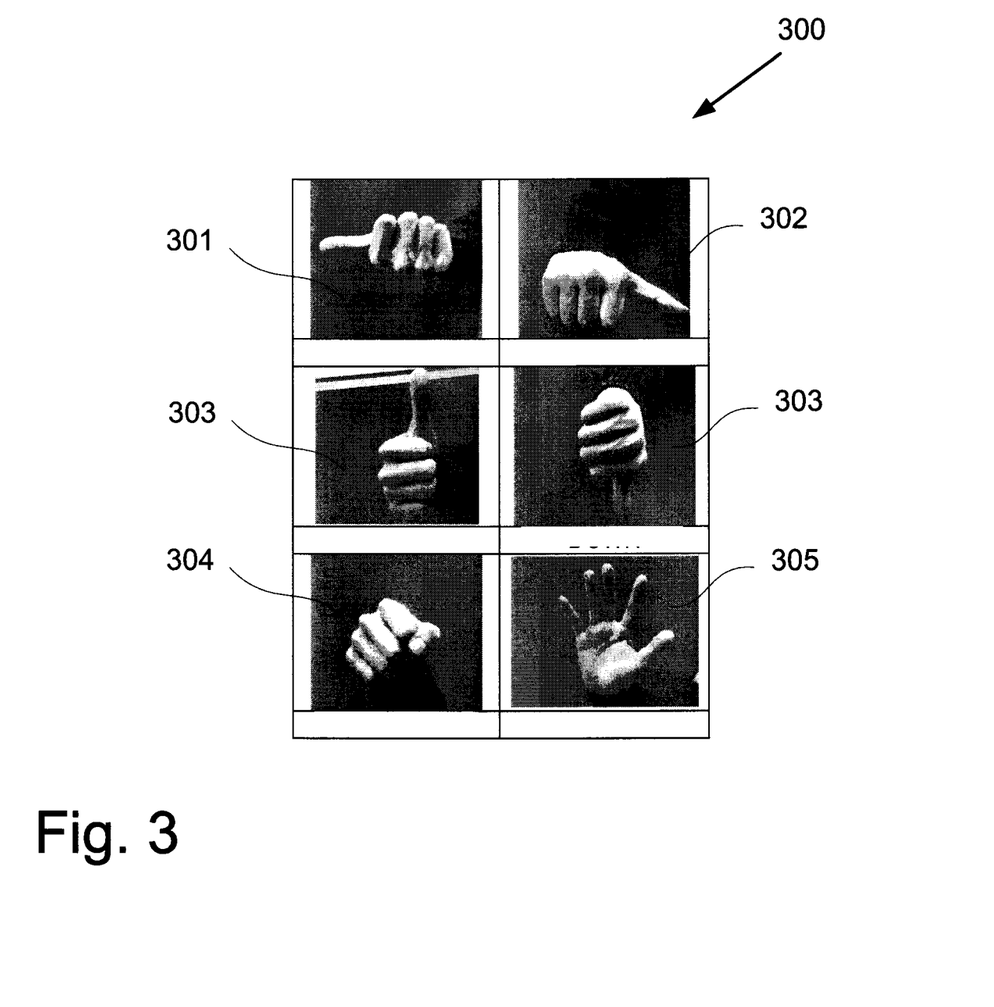
FIG. 3 shows schematic examples of a number of hand gestures, sections a) to f)

FIG. 3 depicts a set of predefined fixed, reference hand gestures 300. Sections a) to d) of FIG. 3 shows a closed hand with the thumb pointing: a) to the right 301 for indicating motion to the right, b) to the left 302 for indicating motion to the left, c) up 303 for indicating motion upwards, d) down 304 for indicating motion downwards. Section e) of FIG. 3 shows a closed hand 305 for indicating stop or close. Section f) of FIG. 3 shows an open hand 306 for indicating open or accept. The indication of motions may refer to maneuvering in menus, toggling between items such as messages, images, contact details, web pages, files, etc, or scrolling through an item. Other hand gestures (not shown) include moving hand gestures such as drawing of a tick in the air with an index finger for indicating a selection, drawing a cross in the air with the index finger for indicating deletion of an active object such as a message, image, highlighted region or the like. A terminal may be distributed to the end user comprising a set of predetermined hand gestures. A user may also define personal hand gestures or configure the mapping between hand gestures and the associated actions according to needs and personal choice.

In other words, a user interface interaction is enabled through provision of certain, defined hand gestures. Hence, hand gestures can be used for command input, and entry of letters and digits as well. According to one application, namely media gallery navigation, in which "Up" is used to move the focus up, "Down" to move the focus down, "Left" to move the focus left, "Right" to move the focus right, "Stop" means the focus movement is stopped, "Open" is used to open a focused picture, and "Close" is used to close an opened picture in the gallery. The hand gestures also can be used for controlling the movement of an object on a graphical user interface, e.g. the movement of the worm in the well known greedy worm game.

According to one implementation, the communication terminal is configured to register and interpret motions of an object, preferably with a built-in camera combined with software that registers and analyses motions/patterns in front of it. The terminal is then configured to respond to predetermined motions or patterns of a user's hand, for instance to select and execute actions such as opening and/or closing items of media content, accessing previous or next item of media content in a list or stack of items, deleting an item of media content, scrolling through the content of an item of media content, answering an incoming voice call, take an action on an item selected from a list of items, call the sender of an SMS or take actions in connection with an incoming communication, such as an SMS (Short Messaging Service) or MMS (Multimedia Messaging Service). In the two last mentioned cases, motions or patterns mentioned previously may comprise a closed fist which may be interpreted by the communication terminal to delete the message, tilting of the hand may be used to go to next message in the folder or list of messages, tilting upward may indicate going forward in the list and tilting downward going back in the list. A number of actions can be associated with different patterns by rotating, tilting, circling or simply moving the hand back and forth or up and down. A pattern may also comprise a series or sequence of motions. The communication terminal may be configured to recognize a number of pre-set motions. However, it may also be possible for a user to configure individual motions, or adjust the motions to better match existing patterns.

Hence, using proximity detection, a gesture of approaching the terminal with an object may trigger the terminal to activate the projector to present information of the incoming communication. A proximity sensor detects when something comes into its proximity. Such a sensor, which gives a switched output on detecting something coming into proximity, is called a proximity switch.

Finally, the above described embodiments provide a convenient and intuitive way of providing input to a communication terminal. It is well suited for provision in connection with devices of reduced size. It is also particularly convenient in situations and environments where the hands of a person are exposed to fluids or other substances, such that physical contact with the terminal is directly undesirable.

The invention claimed is:

1. A method for invoking an operation of a communication terminal in response to registering and interpreting a predetermined motion or pattern of an object, the method comprising:
   receiving an indication of a predetermined motion or pattern of a single occurrence of a hand input gesture received from a digital camera of the communication terminal;
   identifying at least a first and second centroid in the object;
   identifying at least one convex hull in the object;
   matching the hand input gesture received from the digital camera with a reference gesture object selected from a set of reference gesture objects based on a positional relationship of the at least first and second centroids in the object and a change in size of the convex hull; and
   executing a command related to an item of a display of the communication terminal in response to and upon matching the single occurrence of the hand input gesture received from the digital camera with the reference gesture object.

2. The method according to claim 1, wherein said interpretation of a motion or pattern is performed by a software of said terminal.

3. The method according to claim 1, wherein said operation involves provision of a command input to the communication terminal based on the single occurrence of the hand input gesture, and that said method comprises:
   capturing image data of said hand input gesture using the digital camera of the communication terminal;
   identifying an object in said image data;
   recognizing the object as a hand;
   recognizing and associating characteristics of said object as a gesture of said hand with a single, first reference gesture from a set of predetermined reference gestures;
   providing a command input associated with said single reference gesture.

4. The method according to claim 3, wherein said identification involves classifying skin color.

5. The method according to claim 4, wherein said skin color classification comprises performing Gaussian mixture modeling.

6. The method according to claim 4, wherein said skin color classification involves color space analysis and/or probability analysis.

7. The method according to claim 6, wherein said color space analysis involves converting image data to chrominance plane (CbCr) color space image data.

8. The method according to claim 3, wherein said object recognition involves eliminating visual noise using connected component extraction.

9. The method according to claim 8, wherein said connected component extraction comprises any of the following:
   determining aspect ratio of the object;
   determining size of object compared to image size;
   determining regions connecting to the borders of the input image; and
   wherein said noise is eliminated in case the following requirements are fulfilled:
   said aspect ratio is within 10;
   said object size is greater than a predetermined value set in relation to the input image size; and
   there is either only one region connecting to the borders of the input image, or a plurality of regions which do not meet the other requirements.

10. The method according to claim 3 further comprising determining orientation of said hand and involving:
    determining a Karhunen-Loeve (KL) axis orientation of said object;
    determining a first geometric centerpoint of said object; and
    determining a second geometric centerpoint of a convex polygon of said object, and
    wherein the orientation of said KL axis is used to determine a positional relationship of said first and second centerpoints.

11. The method according to claim 10, wherein said orientation determining arrives at one of the following:
    performing a first operation if said KL-axis extends along a first direction, and the first and second centerpoints are displaced in a first displacement direction in relation to each other, essentially along said first direction;

performing a second operation if said KL-axis extends along said first direction, and the first and second centerpoints are displaced reversely in said displacement direction in relation to each other, essentially along said first direction;

performing a third operation if said KL-axis extends along a second direction, essentially perpendicular to said first direction, and the first and second centerpoints are displaced in a second displacement direction in relation to each other, essentially along said second direction;

performing a fourth operation if said KL-axis extends along said second direction, and the first and second centerpoints are displaced reversely in said displacement direction in relation each other, essentially along said second direction;

performing a fifth operation if said centerpoints are essentially superpositioned, and a first area of said object of said gesture is less than at least half a second area of a previously determined object of a previously recognized gesture;

performing a sixth operation if said centerpoints are essentially superpositioned, a first area of said object of said gesture is greater than at least twice a second area of a previously determined object of a previously recognized gesture, and said gesture corresponds to said previously recognized gesture;

performing a seventh operation if said centerpoints are essentially superpositioned, a first area of said object of said gesture is greater than at least twice a second area of a previously determined object of a previously recognized gesture, and said gesture does not correspond to said previous gesture.

12. The method according to claim 11, wherein said first, second, third, and fourth operations correspond to moving focus up, down, left, and right respectively, and said fifth, sixth, and seventh operations correspond to open an item, close an item, and stop the focus motion respectively.

13. The method according to claim 1, wherein said registering is performed using a camera of said communication terminal.

14. The method according to claim 1, further comprising a step of activation by proximity detection.

15. A computer-readable storage medium having computer-executable components embodied there, said computer-readable medium being configured to execute the method according to claim 1.

16. The computer-readable storage medium according to claim 15, further being configured to:
receive an input;
capture image data of said object;
identify said object in said image data;
recognize said object as a hand;
recognize and associate characteristics of said object as a gesture of said hand with a first reference gesture from a set of predetermined reference gestures;
provide a command input associated with said reference object.

17. The method of claim 1 wherein the item is a document, a folder, a web page, a call, a message, a contact item, a multimedia content item, a reminder, or a textual entry.

18. The method of claim 17 wherein the hand gesture corresponds to a command to maneuver a menu on the display or toggle between items on the display.

19. An apparatus comprising:
a processor; and
a memory including computer program code, wherein the memory and the computer program code are configured to, along with the processor, cause the apparatus at least to perform:
invoking an operation of the apparatus in response to registering and interpreting a predetermined motion or pattern of an object;
receiving an indication of a predetermined motion or pattern of a single occurrence of a hand input gesture received from an imaging unit;
identifying at least a first and second centroid in the object;
identifying at least one convex hull in the object;
matching the hand input gesture received from the imaging unit with a reference gesture object selected from a set of reference gesture objects based on a positional relationship of the at least first and second centroids in the object and a change in size of the convex hull; and
executing a command in the apparatus in response to and upon matching the single occurrence of the hand input gesture received from the imaging unit with the reference gesture object.

20. The apparatus of claim 19, wherein detecting a predetermined motion or pattern of a single occurrence of a hand input gesture comprises classifying a skin color of the hand.

21. The apparatus of claim 19, wherein detecting a predetermined motion or pattern of a single occurrence of a hand input gesture comprises determining orientation of a hand, comprising:
determining a Karhunen-Loeve (KL) axis orientation of said object; determining a first geometric centerpoint of said object; and
determining a second geometric centerpoint of a convex polygon of said object, and wherein the orientation of said KL axis is used to determine a positional relationship of said first and second centerpoints.

22. The apparatus of claim 19, wherein the apparatus is a communication terminal.

23. The apparatus of claim 19, wherein the command operates on a document, a folder, a web page, a call, a message, a contact item, a multimedia content item, a reminder, or a textual entry.

* * * * *